United States Patent
Peng et al.

(10) Patent No.: US 11,307,621 B2
(45) Date of Patent: Apr. 19, 2022

(54) DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventors: Ningkun Peng, Hubei (CN); Shaojing Wu, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 176 days.

(21) Appl. No.: 16/803,659

(22) Filed: Feb. 27, 2020

(65) Prior Publication Data

US 2021/0191480 A1 Jun. 24, 2021

(51) Int. Cl.
*G06F 1/18* (2006.01)
*G09G 3/20* (2006.01)

(52) U.S. Cl.
CPC .............. *G06F 1/182* (2013.01); *G06F 1/189* (2013.01); *G09G 3/20* (2013.01); *G09G 2300/0426* (2013.01); *G09G 2330/04* (2013.01)

(58) Field of Classification Search
CPC ............ H01L 27/0288; H01L 27/1244; H01L 27/3272; H01L 27/3276; H01L 23/60; G02F 1/133388; G02F 1/133334; G02F 1/136204; G02F 1/136218; G02F 2202/22
See application file for complete search history.

(56) References Cited

U.S. PATENT DOCUMENTS

2018/0108649 A1* 4/2018 Cheng ................. H01L 27/0296
2018/0342539 A1* 11/2018 Yong .................... H01L 27/1262

* cited by examiner

*Primary Examiner* — Gerald Johnson

(57) ABSTRACT

A display panel has a non-display area comprising a GOA wiring area is provided. The display panel includes GOA wirings disposed in the GOA wiring area, and an electrostatic shielding unit, disposed at least corresponding to the GOA wirings of part of the GOA wiring area. The electrostatic shielding unit is configured to prevent the GOA wirings from being damaged by static electricity.

9 Claims, 2 Drawing Sheets

DISPLAY PANEL

BACKGROUND

1. Field of the Invention

The present application relates to the field of display technology, more particularly, to a display panel.

2. Description of the Related Art

At present, display panels are evolving towards slimness and high performance. The characteristics of high contrast, wide color gamut, low power consumption, and foldability are the outstanding advantages of display technology today. However, because the panel is affected by factors such as design and manufacturing method, it is very easy to be damaged by static electricity, in particular, the gate on array (GOA) wirings are easily damaged. Therefore, it is very important to prevent the GOA wirings from being damaged by static electricity to achieve the electrostatic protection for the display panel.

SUMMARY OF THE INVENTION

One embodiment of the present application provides a display panel, which can prevent the GOA wirings located in the non-display area of the display panel from being damaged by static electricity.

The present application provides a display panel. The display panel has a non-display area. The non-display area comprises a GOA wiring area. The display panel comprises:

GOA wirings, the GOA wirings being disposed in the GOA wiring area; and an electrostatic shielding unit, the electrostatic shielding unit being disposed at least corresponding to the GOA wirings of part of the GOA wiring area, the electrostatic shielding unit being configured to prevent the GOA wirings from being damaged by static electricity.

According one embodiment of the present disclosure, the electrostatic shielding unit comprises an electrostatic shielding layer and an electrostatic shielding signal line;

the electrostatic shielding layer being disposed at least corresponding to part of the GOA wirings;

one end of the electrostatic shielding signal line being electrically connected to the electrostatic shielding layer, another end of the electrostatic shielding signal line being used to load a constant voltage signal.

According one embodiment of the present disclosure, the display panel further comprises a cathode signal line, the GOA wiring area comprising a first GOA wiring area and a second GOA wiring area disposed adjacent to the first GOA wiring area, the cathode signal line being disposed corresponding to the first GOA wiring area, the electrostatic shielding layer being disposed corresponding to the second GOA wiring area.

According one embodiment of the present disclosure, a vertical projection of the electrostatic shielding layer on the display panel overlaps a vertical projection of the GOA wirings in the second GOA wiring area on the display panel.

According one embodiment of the present disclosure, the electrostatic shielding layer is disposed on a same layer as a source/drain, the electrostatic shielding layer is disposed on a same layer as an anode.

According one embodiment of the present disclosure, the display panel further comprises a power management chip, the electrostatic shielding signal line loading the constant voltage signal through the power management chip.

According one embodiment of the present disclosure, the electrostatic shielding signal line comprises a first electrostatic shielding signal line and a second electrostatic shielding signal line located on a different layer from the first electrostatic shielding signal line, the first electrostatic shielding signal line is electrically connected to the second electrostatic shielding signal line.

According one embodiment of the present disclosure, the electrostatic shielding signal line and the GOA wirings of the GOA wiring area and/or a source/drain are disposed on a same layer.

According one embodiment of the present disclosure, the electrostatic shielding signal line is disposed on a same layer as the electrostatic shielding layer.

According one embodiment of the present disclosure, the display panel further comprises a packaging layer, a vertical projection of the packaging layer on the display panel covering a vertical projection of the electrostatic shielding layer on the display panel.

According to the display panel of the embodiment of the present application, the electrostatic shielding unit is disposed at least corresponding to the GOA wirings of part of the GOA wiring area in the non-display area to resolve the problem in the related art that the GOA wirings of the non-display area of the display panel are easily damaged by static electricity.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
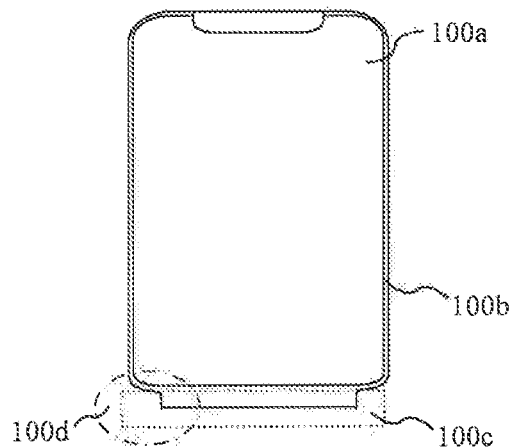
FIG. 1A is a schematic plan view of a display panel according to one embodiment of the present application.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

All of the terminologies containing one or more technical or scientific terminologies have the same meanings that persons skilled in the art understand ordinarily unless they are not defined otherwise. For example, "arrange," "couple," and "connect," should be understood generally in the embodiments of the present disclosure. For example, "firmly connect," "detachably connect," and "integrally connect" are all possible. It is also possible that "mechanically connect," "electrically connect," and "mutually communicate" are used. It is also possible that "directly couple," "indirectly couple via a medium," and "two components mutually interact" are used.

All of the terminologies containing one or more technical or scientific terminologies have the same meanings that persons skilled in the art understand ordinarily unless they are not defined otherwise. For example, "upper" or "lower" of a first characteristic and a second characteristic may include a direct touch between the first and second characteristics. The first and second characteristics are not directly touched; instead, the first and second characteristics are touched via other characteristics between the first and second characteristics. Besides, the first characteristic arranged on/above/over the second characteristic implies that the first characteristic arranged right above/obliquely above or merely means that the level of the first characteristic is higher than the level of the second characteristic. The first characteristic arranged under/below/beneath the second characteristic implies that the first characteristic arranged right under/obliquely under or merely means that the level of the first characteristic is lower than the level of the second characteristic.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

The embodiment of the present application can resolve the problem that the GOA wirings in the non-display area of the display panel in the related art are easy to be damaged by static electricity.

A description is provided with reference to FIG. 1A. FIG. 1A is a schematic plan view of a display panel according to one embodiment of the present application. The display panel comprises at least one display area 100a and a non-display area 100b disposed in a periphery of the display area 100a.

A part area 100c of the non-display area 100b is bent to a bottom of the display panel to achieve a narrow bezel design of the display panel after the display panel is formed into two hinged lines.

Figure 1B:
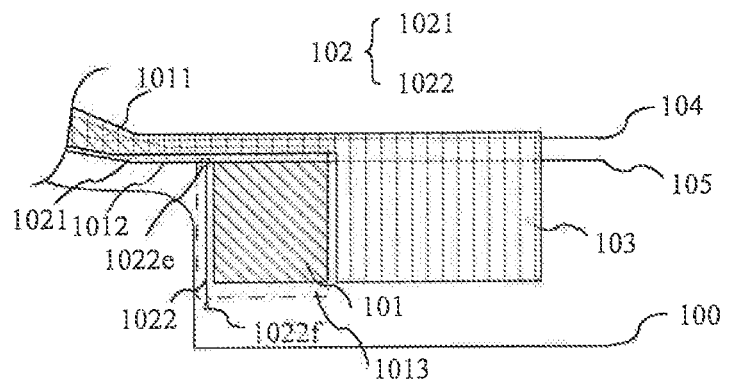
FIG. 1B is a first partially enlarged schematic diagram of the display panel shown in FIG. 1A.
Figure 1C:
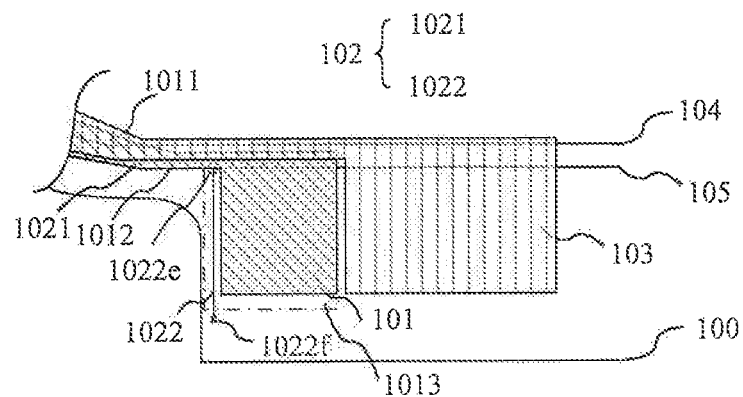
FIG. 1C is a second partially enlarged schematic diagram of the display panel shown in FIG. 1A.
Figure 1D:
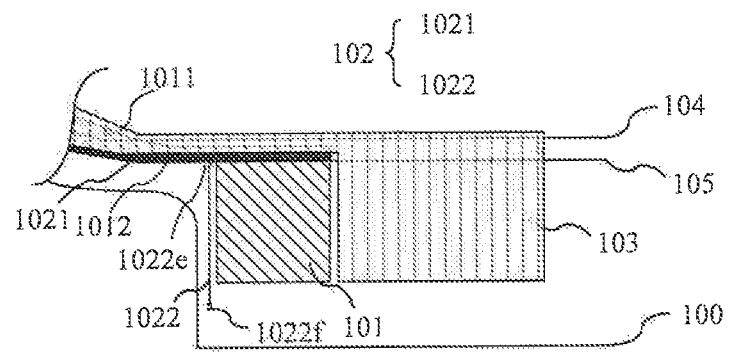
FIG. 1D is a third partially enlarged schematic diagram of the display panel shown in FIG. 1A.

A description is provided with reference to FIG. 1B to FIG. 1D, which are partially enlarged schematic diagrams of the display panel shown in FIG. 1A. A partially enlarged area is an area pointed by 100d in FIG. 1A, that is, a lower left bezel area of the display panel.

As shown in FIG. 1B, which is a first partially enlarged schematic diagram of the display panel shown in FIG. 1A. The display panel has the non-display area 100b. The non-display area 100b comprises a GOA wiring area 101. The display panel comprises:

GOA wirings, the GOA wirings being disposed in the GOA wiring area 101; and an electrostatic shielding unit 102, the electrostatic shielding unit 102 being disposed at least corresponding to the GOA wirings of part of the GOA wiring area 101, the electrostatic shielding unit 102 being configured to prevent the GOA wirings from being damaged by static electricity.

The electrostatic shielding unit 102 comprises an electrostatic shielding layer 1021 and an electrostatic shielding signal line 1022. The electrostatic shielding layer 1021 is disposed at least corresponding to part of the GOA wirings. One end 1022e of the electrostatic shielding signal line 1022 is electrically connected to the electrostatic shielding layer 1021. Another end 1022f of the electrostatic shielding signal line 1022 is used to load a constant voltage signal.

The electrostatic shielding layer 1021 is formed on a same layer as a source/drain of the display panel; and/or the electrostatic shielding layer 1021 is disposed on a same layer as an anode. That is, a light-emitting element is an organic light-emitting diode when the display panel further comprises the light-emitting element. The light-emitting element at least comprises the anode, a light-emitting layer, and a cathode. The electrostatic shielding layer 1021 is disposed on the same layer as the anode.

Figure 2:
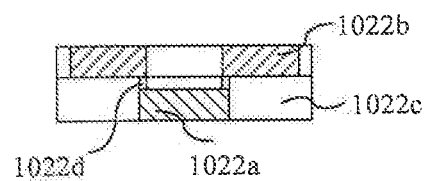
FIG. 2 is a schematic diagram of a structure of an electrostatic shielding signal line according to one embodiment of the present application.

A description is provided with reference to FIG. 2. FIG. 2 is a schematic diagram of a structure of an electrostatic shielding signal line according to one embodiment of the present application. The electrostatic shielding signal line 1022 comprises a first electrostatic shielding signal line 1022a and a second electrostatic shielding signal line 1022b located on a different layer from the first electrostatic shielding signal line 1022a. The first electrostatic shielding signal line 1022a is electrically connected to the second electrostatic shielding signal line 1022b. The electrostatic shielding signal line 1022 and the GOA wirings of the GOA wiring area 101 and/or the source/drain are disposed on a same layer. The first electrostatic shielding signal line 1022a and the GOA wirings of the GOA wiring area 101 are disposed on a same layer. The second electrostatic shielding signal line 1022b is disposed on a same layer as the source/drain. An insulating layer 1022c is disposed between the first electrostatic shielding signal line 1022a and the second electrostatic shielding signal line 1022b. The first electrostatic shielding signal line 1022a and the second electrostatic shielding signal line 1022b are electrically connected through a via hole 1022d.

A description is provided with reference to FIG. 1B. The electrostatic shielding signal line 1022 is connected to the electrostatic shielding layer 1021. The electrostatic shielding signal line 1022 can be directly led out by the electrostatic shielding layer 1021, or different wiring methods can be selected depending on the bottom wiring situation.

Since the end 1022*f* of the electrostatic shielding signal line 1022 that loads the constant voltage signal is close to a lower bezel of the display panel, the wiring of the display panel is more complicated. Therefore, the wiring needs to be changed depending on the wiring situation in an extension direction of the electrostatic shielding signal line 1022 to achieve the function of the electrostatic shielding signal line 1022 and avoid affecting the normal operation of the display panel.

The GOA wiring area 101 comprises a first GOA wiring area 1011 and a second GOA wiring area 1012 disposed adjacent to the first GOA wiring area 1011. A cathode signal line 103 is disposed corresponding to the first GOA wiring area 1011. The electrostatic shielding layer 1021 is disposed corresponding to the second GOA wiring area 1012.

The first GOA wiring area 1011 is disposed close to the display area 100*a* of the display panel. On one side close to the display area 100*a* of the display panel, a vertical projection of at least part of the GOA wirings located in the first GOA wiring area 1011 on the display panel overlaps a vertical projection of part of a cathode layer 104 and/or part of the cathode signal line 103 on the display panel.

The second wiring area 1012 is disposed adjacent to the first GOA wiring area 1011. A vertical projection of the electrostatic shielding layer 1021 on the display panel overlaps a vertical projection of the GOA wirings in the second GOA wiring area 1012 on the display panel.

The GOA wirings in the second GOA wiring area 1012 may have a wiring change problem. Therefore, when the electrostatic shielding layer 1021 is formed on the same layer as the source/drain or an anode layer, the wiring needs to be changed when the electrostatic shielding layer 1021 intersects the GOA wirings in the second GOA wiring area 1012 that are on the same layer and adopt the same metal wiring to avoid a short circuit with the GOA wirings of the second GOA wiring area 1012.

Although the manufacturing processes can be reduced and the manufacturing flow can be simplified when the electrostatic shielding layer 1021 is formed on the same layer as the source/drain or anode layer, the manufacturing processes are actually increased because the wiring change problem is involved in the manufacturing. Therefore, in order to achieve the electrostatic shielding for the second GOA wiring area 1012 without changing the process in the related art, the electrostatic shielding layer 1021 may be another conductive metal layer. That is, a metal, such as Ag, Cu, etc., is used as the electrostatic shielding layer 1021. An insulating layer (not shown in the figure) is disposed between the electrostatic shielding layer 1021 and the second GOA wiring area 1012 to avoid a short circuit between the electrostatic shielding layer 1021 and the second GOA wiring area 1012, which affects the normal operation of the display area. The electrostatic shielding signal line 1022 is disposed on a same layer as the electrostatic shielding layer 1021.

The GOA wiring area 101 further comprises a third GOA wiring area 1013. The third GOA wiring area 1013 is disposed adjacent to the second GOA wiring area 1012. The third GOA wiring area 1013 is bent toward the bottom of the display panel after the display panel is formed into two hinged lines 100. Because the second GOA wiring area 1012 is correspondingly disposed with the electrostatic shielding layer 1021, the electrostatic shielding layer 1021 can provide a shorter conduction path for static electricity. As a result, the third GOA wiring area 1013 may not be disposed with the electrostatic shielding layer 1021.

The display panel further comprises a power management chip (not shown in the figure), and the electrostatic shielding signal line 1022 loads the constant voltage signal through the power management chip. Because the power management chip can provide a constant signal, this signal is sent to the signal shielding layer 1021 after being transmitted through the electrostatic shielding signal line 1022. The electrostatic shielding layer 1021 will gradually reach an electrostatic equilibrium state under the effect of an external electric field, thus achieving the electrostatic shielding for the second GOA wiring area 1012 and preventing the GOA wiring area 101 from being damaged by static electricity.

In addition to that, the electrostatic shielding layer 1021 may further be disposed in other wiring area on the display panel that is not covered by the constant signal line to prevent the wirings from being damaged by static electricity. Therefore, those skilled in the art can reasonably dispose the electrostatic shielding layer 1021 depending on the needs.

The display panel further comprises a packaging layer 105. A vertical projection of the packaging layer 105 on the display panel covers a vertical projection of the electrostatic shielding layer 1021 on the display panel. The packaging layer 105 may be a glass cover or a thin film packaging structure. The thin film packaging structure comprises inorganic film layers and organic film layers that are superimposed on each other. A number of superimposed layers and film thicknesses of the inorganic film layers and the organic film layers are determined by those skilled in the art depending on practical needs.

In order to ensure the effectiveness of the packaging of the display panel, a flat layer around a boundary line of the packaging layer 105 near the two hinged lines 100 will be etched away, which may cause the electrostatic shielding signal line 1022 to be eroded by moisture and oxygen. However, the moisture and oxygen erosion only involves one signal line, that is, the electrostatic shielding signal line 1022, and will not affect the other signal lines. As a result, the other portions of the display panel are not affected.

A description is provided with reference to FIG. 1C. FIG. 1C is a second partially enlarged schematic diagram of the display panel shown in FIG. 1A. The display panel shown in FIG. 1C is basically similar to the display panel shown in FIG. 1B. The difference lies in that the electrostatic shielding layer 1021 is disposed corresponding to the GOA wirings of the second GOA wiring area 1012 and the third GOA wiring area 1013. As compared with the display panel shown in FIG. 1B, in which the packaging layer 105 only protects the electrostatic shielding layer disposed corresponding to the GOA wirings of the second GOA wiring area 1012 and the GOA wirings disposed corresponding to the third GOA wiring area 1013 are easily corroded, the electrostatic shielding layer in FIG. 1C disposed corresponding to the GOA wirings of the third GOA wiring area 1013 can protect the GOA wirings from being corroded, and can achieve the electrostatic shielding for the GOA wirings of the third GOA wiring area 1013.

A description is provided with reference to FIG. 1D. FIG. 1D is a third partially enlarged schematic diagram of the display panel shown in FIG. 1A. The electrostatic shielding layer 1021 is a metal grid structure. The grid structure comprises a hexagon, a fence, a rectangle, a triangle, or the like, and each shape is preferably but not limited to a regular hexagon, a square, a regular triangle, or the like.

The shielding effect of the electrostatic shielding layer 1021 is affected by the grid distribution density to a certain extent. When a geometric size of the metal grid is larger, the density of the grid distribution is smaller, and the grid arrangement is sparser. At this time, the electrostatic shielding performance will also be weakened. Therefore, in consideration of cost, manufacturing method and shielding effect, a denser grid structure can be preferentially selected to ensure the electrostatic shielding effect. If a sparser grid structure can meet the shielding requirement, the sparser grid structure can be selected to save the cost.

In addition, the shielding effect of the electrostatic shielding layer 1021 is also affected by the grid structure to a certain extent. With the same material, the shielding effect of the electrostatic shielding layer 1021 varies according to the different shapes of the metal grid. When the metal grid is a regular hexagon, a fence, or a square structure, the shielding effect of the electrostatic shielding layer 1021 is better than the shielding effect when the metal grid is a regular triangle or other shape. If the material is not considered, the shielding effect of the electrostatic shielding layer that adopts the entire metal layer structure shown in FIG. 1C is the best. Those skilled in the art can reasonably select the required structural shape depending on the practical cost of material (s) and the shielding effect to be achieved.

According to the display panel of the embodiment of the present application, the electrostatic shielding unit 102 is disposed at least corresponding to the GOA wirings of part of the GOA wiring area 101 in the non-display area to resolve the problem in the related art that the GOA wirings of the non-display area of the display panel are easily damaged by static electricity.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A display panel having a non-display area, the non-display area comprising a GOA wiring area, the display panel comprising:
    GOA wirings, the GOA wirings being disposed in the GOA wiring area; and
    an electrostatic shielding unit, the electrostatic shielding unit being disposed at least corresponding to the GOA wirings of part of the GOA wiring area, the electrostatic shielding unit being configured to prevent the GOA wirings from being damaged by static electricity,
    wherein the electrostatic shielding unit comprises an electrostatic shielding layer and an electrostatic shielding signal line;
    the electrostatic shielding layer being disposed at least corresponding to part of the GOA wirings;
    one end of the electrostatic shielding signal line being electrically connected to the electrostatic shielding layer, another end of the electrostatic shielding signal line being used to load a constant voltage signal.

2. The display panel as claimed in claim 1, further comprising a cathode signal line, the GOA wiring area comprising a first GOA wiring area and a second GOA wiring area disposed adjacent to the first GOA wiring area, the cathode signal line being disposed corresponding to the first GOA wiring area, the electrostatic shielding layer being disposed corresponding to the second GOA wiring area.

3. The display panel as claimed in claim 2, wherein a vertical projection of the electrostatic shielding layer on the display panel overlaps a vertical projection of the GOA wirings in the second GOA wiring area on the display panel.

4. The display panel as claimed in claim 1, wherein the electrostatic shielding layer is disposed on a same layer as a source/drain, the electrostatic shielding layer is disposed on a same layer as an anode.

5. The display panel as claimed in claim 1, further comprising a power management chip, the electrostatic shielding signal line loading the constant voltage signal through the power management chip.

6. The display panel as claimed in claim 1, wherein the electrostatic shielding signal line comprises a first electrostatic shielding signal line and a second electrostatic shielding signal line located on a different layer from the first electrostatic shielding signal line, the first electrostatic shielding signal line is electrically connected to the second electrostatic shielding signal line.

7. The display panel as claimed in claim 1, wherein the electrostatic shielding signal line and the GOA wirings of the GOA wiring area and/or a source/drain are disposed on a same layer.

8. The display panel as claimed in claim 1, wherein the electrostatic shielding signal line is disposed on a same layer as the electrostatic shielding layer.

9. The display panel as claimed in claim 1, further comprising a packaging layer, a vertical projection of the packaging layer on the display panel covering a vertical projection of the electrostatic shielding layer on the display panel.

* * * * *